Patented May 18, 1937

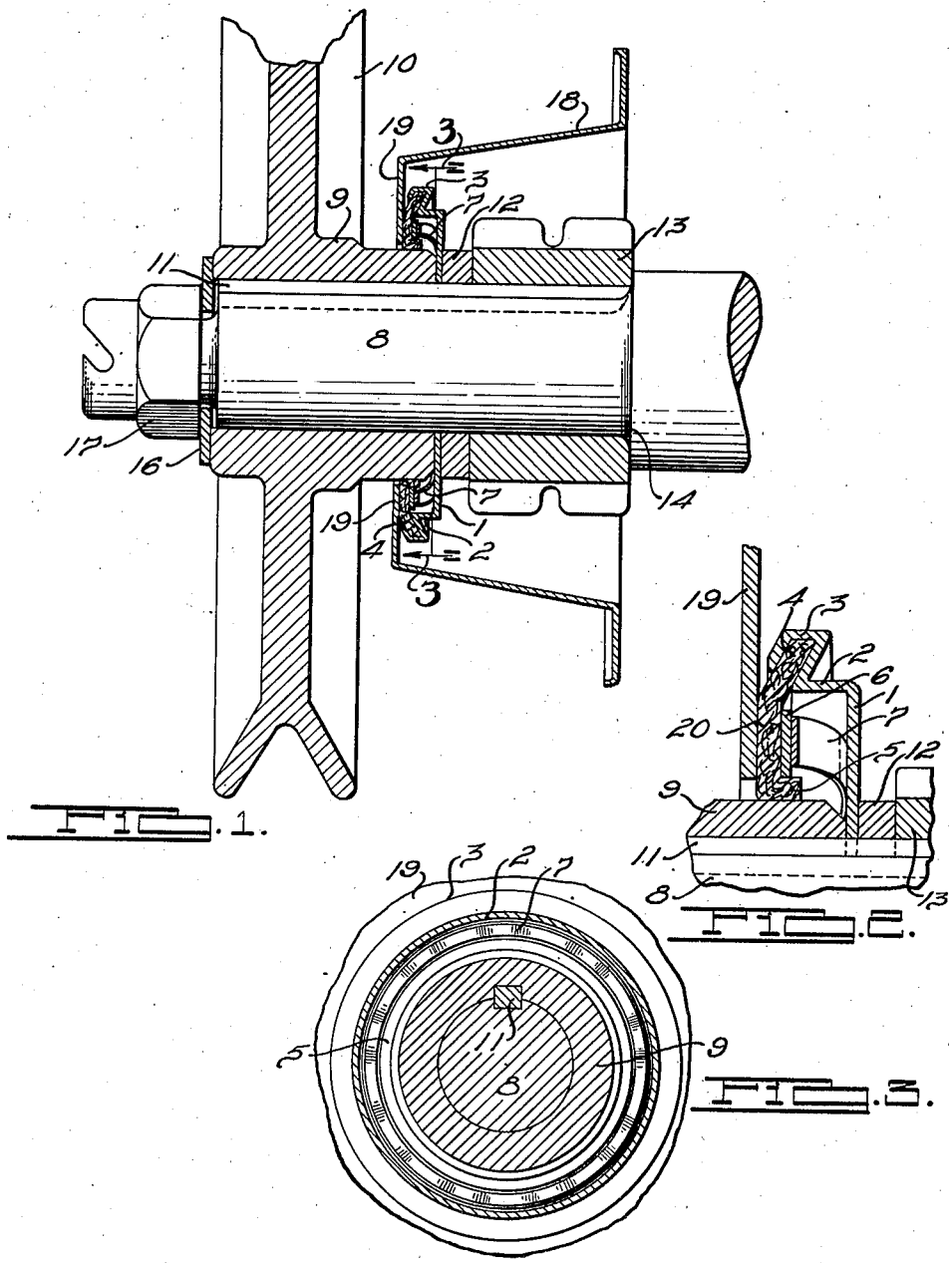

2,080,669

UNITED STATES PATENT OFFICE 2,080,669

OIL SEAL

Thomas Edward Nelson, Pontiac, Mich.

Application March 4, 1936, Serial No. 67,007

2 Claims. (Cl. 286—11)

This invention relates to oil seals and the object of the invention is to provide an oil seal which is mounted to rotate with a rotatable member and is arranged to provide a seal against a flat face to prevent oil leakage.

Another object of the invention is to provide an oil seal comprising a resilient packing ring held in angular position and provided with a wave spring to maintain the free edge of the packing ring in contact with a surface to be sealed.

A further object of the invention is to provide an oil seal comprising a sheet metal retainer, a packing ring secured in the retainer and a wave spring urging the packing ring into engagement with the stationary surface.

Another object of the invention is to provide an oil seal for retaining the oil within a housing, the arrangement being such that the oil seal prevents leakage along the rotating member and also prevents leakage between the oil seal and the stationary housing.

A further object of the invention is to provide an annular retainer provided with an angular channel at the edge in which the resilient packing or washer is held, said angular channel being so positioned as to remain out of contact with the stationary housing and, at the same time, allow the packing washer to be held in contact with the housing by a wave spring.

These objects and the several novel features of the invention are hereinafter more fully described and claimed and the preferred form of construction by which these objects are attained is shown in the accompanying drawing in which—

Fig. 1 is a section through a fan belt pulley and housing showing the oil seal as used therewith.

Fig. 2 is an enlarged section through the oil seal and adjacent members.

Fig. 3 is a section taken on line 3—3 of Fig. 1.

The oil seal is shown more particularly in Fig. 2 and comprises an annular sheet metal retainer 1 having a flange 2 and provided at the edge of the flange 2 with a channel 3 which extends at an angle to the plane of the retainer. Secured in the channel 3 is a resilient washer 4 which may be formed of leather, cork, asbestos, laminated fabric or other suitable material. This washer 4 is provided with an aperture in the center and with an inturned annular edge 5 about the central aperture. A sheet metal ring 6 is positioned within the washer 4 and an annular wave spring 7 is positioned in the retainer 1 and engages the ring 6 to force it outwardly.

In use, the retainer 1 is provided with a central aperture through which the shaft 8 extends and the hub 9 of a fan belt pulley 10 is positioned over the shaft 8 and is secured thereto by the key 11 shown in Fig. 1. The retainer 1 is positioned over the shaft 8 against the end of the hub 9 and an annular spacer 12 is also positioned over the shaft so that the retainer 1 is held in position between the hub 9 of the fan belt pulley and the spacer 12. A member 13 is also positioned over and keyed to the shaft 8 and engages against the shoulder 14 provided on the shaft 8. A washer 16 is provided engaging the end of the hub 9 and a nut 17 may be turned up to force the members 9, 12 and 13 toward the right of Fig. 1 into firm engagement with the shoulder 14 on the shaft 8.

By this arrangement the retainer is secured to rotate with the shaft 8 and is provided with a notch through which the key 11 extends. A housing 18 is provided as shown in Fig. 1 and this housing 18 is formed with an integral flange 19 extending transversely to the axis of the shaft 8 but out of contact with the pulley hub 9 as shown in Fig. 1. The wave spring 7 forces the ring 6 to the left of Figs. 1 and 2 thus forcing the resilient washer 4 into firm engagement with the flange 19 of the housing 18 and it will be noted that the inturned edge 5 of the resilient washer 4 fits tightly about the member 9 and prevents leakage between the washer and said member 9. As the shaft is rotated the oil seal is rotated in contact with the flange 19 and by means of the wave spring 7 a tight oil seal is provided at the line 20 shown in Fig. 2. The wave spring 7 allows the resilient washer 4 to conform to the surface of the flange 19 and, at the same time, maintains the washer in proper yielding contact with the flange 19. The wave spring 7 also allows for slight variation in position of the flange 19 in relation to the oil seal without affecting the sealing action between the resilient washer and the flange.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In an oil seal, the combination with a rotary member and a stationary member having a face extending in a plane transverse to the axis of the rotary member, a cup-shaped sheet metal retainer secured to the rotary member, an annular channel formed in the outer edge of the cup-shaped retainer and extending at an angle to the plane of the retainer, a resilient washer secured in the channel and extending at an angle to the plane of the retainer and into contact with the face of the stationary member, the resilient washer being provided with an aperture at the center, a wave spring engaging against the cup-shaped member and urging the resilient washer into engagement with the face of the stationary member, a ring positioned between the wave spring and the resilient washer and the inner edge of the resilient washer about the central aperture being inturned through the center of the ring, said inturned edge fitting tightly about the rotary member and preventing oil leakage longitudinally of the rotary member.

2. In an oil seal, the combination with a rotary member and a stationary face to be sealed, of a cup-shaped retainer secured to the rotary member in spaced relation with said face, an annular channel formed in the outer edge of said cup-shaped retainer and extending at an angle to the axis of the rotary member, a resilient washer secured in the channel and extending at an angle into engagement with the face to be sealed, the portion of the washer in contact with said face extending transversely to the axis of the rotary member, the inner edge of said resilient washer being inturned in engagement with the periphery of the rotary member, a ring fitting about said inturned edge and a wave spring between said ring and cup-shaped retainer, the wave spring urging the resilient washer into engagement with said face.

THOMAS EDWARD NELSON.